United States Patent [19]

Matsushita

[11] Patent Number: 4,629,109
[45] Date of Patent: Dec. 16, 1986

[54] JIG FOR WELDING FRAMES

[75] Inventor: Kazuyoshi Matsushita, Akishima, Japan

[73] Assignee: Tachikawa Spring Co. Ltd, Tokyo, Japan

[21] Appl. No.: 755,737

[22] Filed: Jul. 17, 1985

[51] Int. Cl.⁴ .............................................. B23K 37/04
[52] U.S. Cl. ..................................... 228/49.1; 228/32; 228/47; 228/49.3; 228/49.2; 269/203; 269/25; 269/289 R; 269/73
[58] Field of Search ..................... 228/49.1, 29, 32, 47, 228/49.3, 49.2; 269/203, 25, 253, 289 R, 73, 40, 58

[56] References Cited

U.S. PATENT DOCUMENTS 3,270,591 9/1966 Winter .................................... 269/58
4,056,136 11/1977 Miller ..................................... 269/289
4,133,470 1/1979 Trail ...................................... 228/49.1
4,535,927 8/1985 Matsubara et al. .................... 228/47

Primary Examiner—Nicholas P. Godici
Assistant Examiner—Karen Skillman
Attorney, Agent, or Firm—Cushman, Darby & Cushman

[57] ABSTRACT

A jig for automatically welding pipe frames used to form vehicle seats is disclosed. In this jig, there is provided on a frame carrying plate a guide element having the reference plane of one of two side portions of a frame, so that the one side portion of the frame can be welded while it is in abutment with the guide element. To weld the other side portion of the frame, the frame carrying plate is moved and two adjusters provided in a bed plate are used for the reference. With such structure, while a welding machine remains fixed, by changing the references according to the portions to be welded in the width direction of the pipe frame, it is possible to weld the two side portions of the frame accurately.

6 Claims, 6 Drawing Figures

JIG FOR WELDING FRAMES

BACKGROUND OF THE INVENTION

1. Field of the Invention

The present invention relates to a jig for welding a pipe frame used to form a vehicle seat, and more particularly to a welding jig using a robot machine.

2. Description of the Prior Art

Recently, an automatic welding operation by means of a robot machine has been widely employed for the purpose of laborsaving. In the automotive-seat industry, a metal pipe frame for an automotive seat is conventionally formed by bending a pipe material into a frame-like configuration, so that the products vary in width dimensions. That is, in the prior art, it is impossible to obtain pipe frames of a given width.

Also, clamps for mounting zigzag springs must be welded to the right and left portions of the pipe frame extending in the width direction thereof. However, when the automatic welding operation using the robot machine is carried out for this purpose, it is found that the clamps cannot be properly welded to the given places of the pipe frame, because the pipe frames are not constant in width dimensions.

Since the automatic welding operation is impractical for the reason mentioned above, presently the clamps must be welded one by one manually, which results in a poor working property.

SUMMARY OF THE INVENTION

Accordingly, it is a primary object of the invention to provide a welding jig which is capable of accurately welding clamps and the like to pipe frames varying in width dimensions to realize an automatic welding by means of a robot machine.

In accomplishing this object, according to the invention, on a frame carrying plate there is provided a guide element having a datum plane of one side portion of the pipe frame, so that the one side portion of the pipe frame can be welded while such side portion is in abutment against the guide element and the other side portion of the pipe frame can be welded by moving the frame carrying plate and by using adjusters provided on a bed plate as standards. Thus, since the welding operations can be performed by changing the standards according to the respective welding portions of the pipe frame in its width direction while a welding apparatus remains fixed, it is possible to weld both of the right and left side portions of the pipe frame accurately. For this reason, use of the welding jig according to the invention permits the automatic welding operations by means of the robot machine, which results in a greatly enhanced working property.

The above and other related objects and features of the invention will be apparent from a reading of the following description of the disclosure found in the accompanying drawings and the novelty thereof pointed out in the appended claims.

DETAILED DESCRIPTION OF A PREFERRED EMBODIMENT OF THE INVENTION

Figure 1:
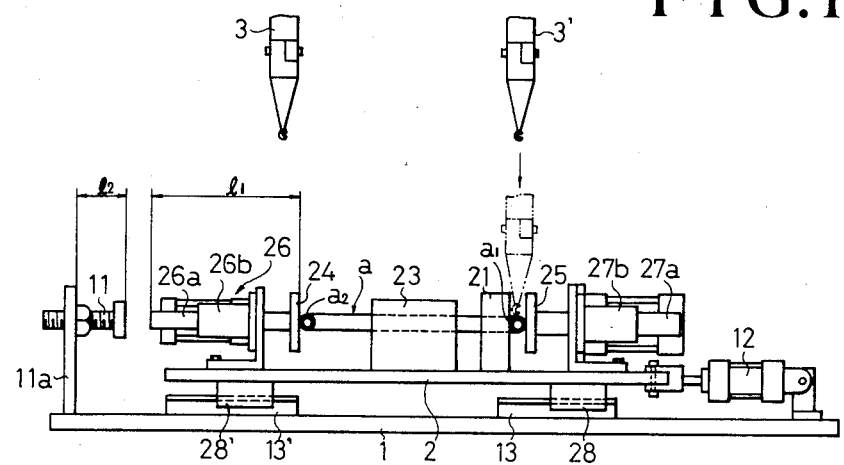
FIG. 1 is a top plan view of a welding jig according to the invention.

Referring now to FIG. 1, there is illustrated a welding jig of the invention before setting of a pipe frame (a), in which a bed plate (1) is provided with a frame carrying plate (2) movably mounted thereto by means of an air cylinder (12), and there are also provided two adjusters (11) (11') on the end of the bed plate (1) toward which the frame carrying plate (2) is moved by the air cylinder (12). These adjusters (11) (11') are threadedly inserted through a vertical member (11a) vertically fixed onto the bed plate (1) so that they can be moved in the direction of movement of the frame carrying plate (2). In the drawings, reference numerals (13) (13') respectively designate guide rails along which the above-mentioned frame carrying plate (2) is moved.

The frame carrying plate designated by (2) is provided with a pair of grasp members which are two air cylinders (26) (27) being opposed to each other in the forward and rearward portions in the direction of movement of the frame carrying plate (2). These grasp members respectively comprise grasp plates (24) (25) provided in the tip ends of the air cylinders (26) (27), and guide rods (26a) (26a), (27a) (27a) slidably inserted through tubular bodies (26b) (27b) which are respectively provided on the opposite sides of the air cylinders (26) (27). Therefore, when the two air cylinders are actuated respectively, then the grasp plates (24) (25) are moved in the directions of arrows shown in FIG. 1, respectively. As on the one grasp plate (25) of tese two grasp plates (24) (25) a guide element (21) is vertically fixed onto the frame carrying plate (2), one side portion (a1) of the pipe frame (a) is grasped by the guide element (21) and the grasp plate (25) therebetween.

Welding torches designated by (3) (3') in the drawings are respectively provided forwardly and rearwardly in the direction of movement of the frame carrying plate (2) such that they can be moved vertically and independently of each other. One torch (3') of them is located above the datum plane of the one side portion (a1) of the frame (a), while the other torch (3) is located above the datum plane of the other side portion (a2) of the frame (a).

In the drawings, (23) (23') respectively designate guide members for connecting the upper and lower portions of the frame (a) with each other, and (28) (28') respectively represent slide members provided on the bottom surface of the frame carrying plate (2) and mounted slidably to the guide rails (13) (13') of the bed plate (1).

Figure 2:
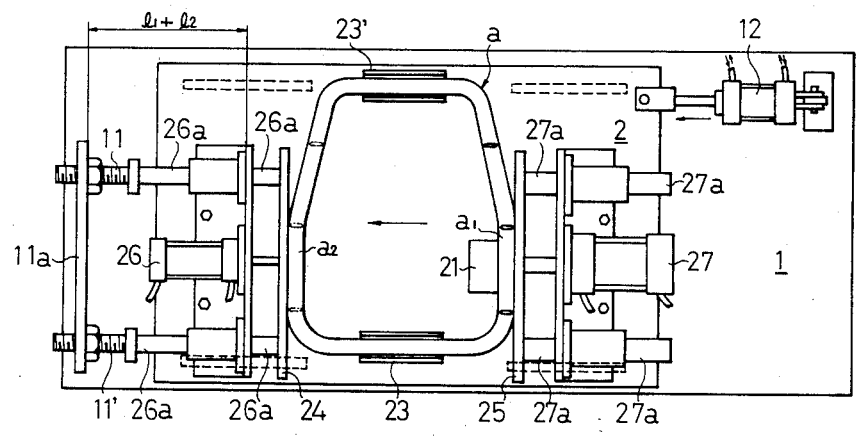
FIG. 2 is a top plan view of the above jig, illustrating the state in which a pipe frame is set.
Figure 3:
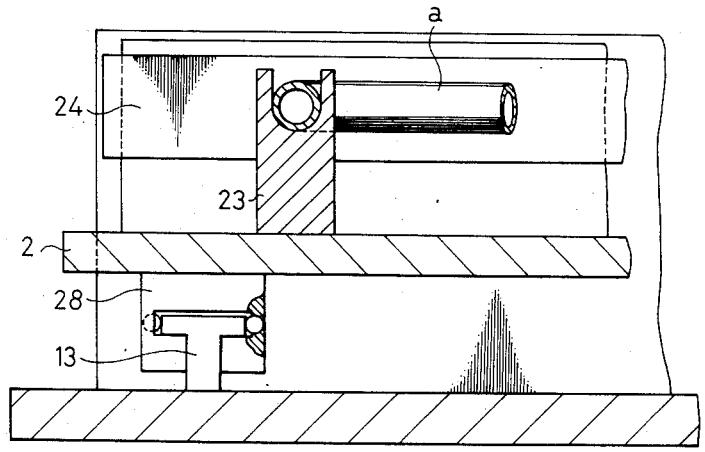
FIG. 3 is a section view taken along line III—III in FIG. 2.
Figure 4:
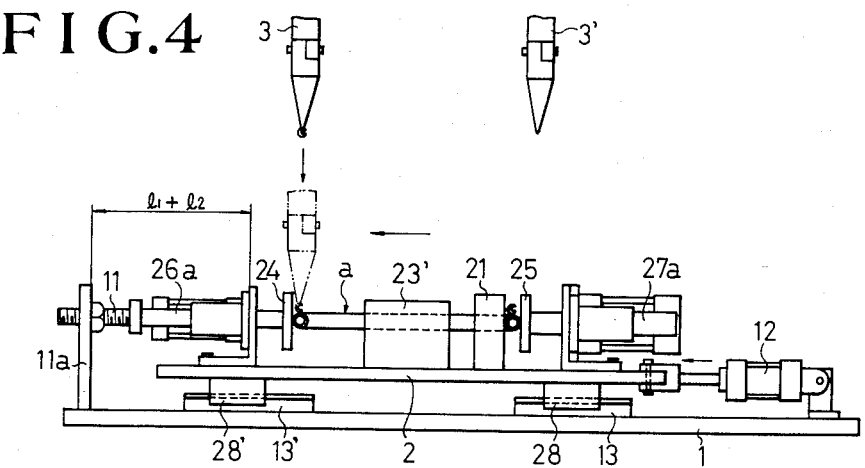
FIG. 4 is a section view of the jig in FIG. 2.

Referring now to FIG. 2, there is illustrated a top plan of an embodiment of the invention in which the pipe frame (a) is now being set on the frame carrying plate (2). In particular, the upper and lower portions of the frame (a) are respectively inserted through the guide members (23) (23'), the forward and rearward air cylinders (27) (26) are operated, and the two side portions (a1) (a2) of the frame (a) are respectively grasped by the grasp plates (25) (24). During this, since the air cylinder (27) is arranged such that it is greater in power than the other air cylinder (26), due to the resultant pressure of the grasp plate (25) the one side portion (a1) of the frame (a) can be grasped by and between the guide element (21) and the grasp plate (25), allowing the size variation of the frame (a) in the width direction thereof to escape to the other side portion (a2). Accordingly, since the one side portion (a1) of the frame (a) is placed at a given position with respect to the torch (3'), as shown by two-dot lines in FIG. 4, clamps can be welded to the one side portion (a1) by the torch (3').

Figure 5:
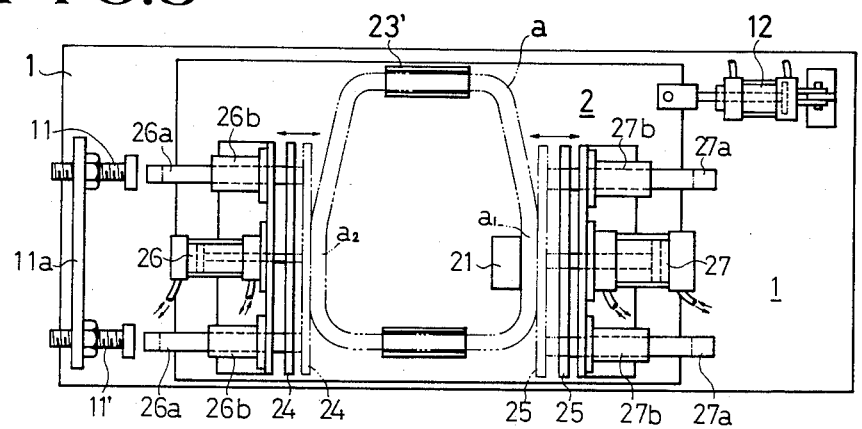
FIG. 5 is a top plan view of the jig, illustrating the state in which a frame carrying plate is moved; and, FIG. 6 is a section view of the jig in FIG. 5.
Figure 6:
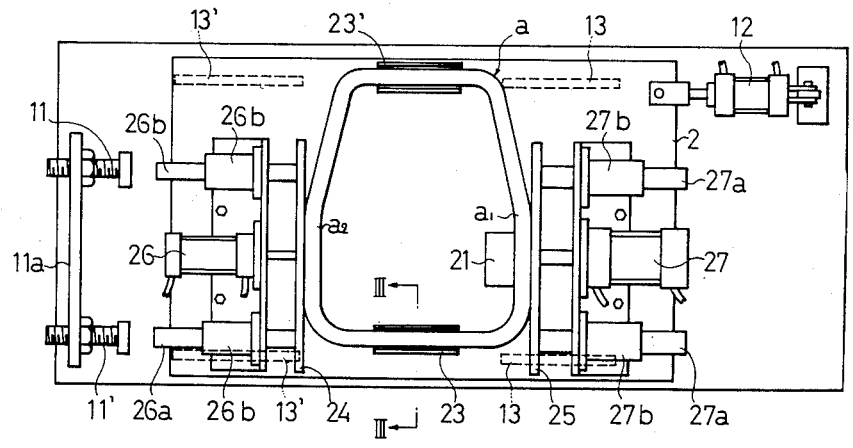

After completion of this welding operation, if the air cylinder (12) (which should be equal to or less than the air cylinder (26) in power) is actuated, then the frame carrying plate (2) is moved as shown in FIG. 5. With this movement of the frame carrying plate (2), the guide rods (26a) (26a) are abutted against the adjusters (11) (11') of the bed plate (1) respectively, so that the frame carrying plate (2) is caused to stop. Therefore, assuming that the full length of the guide rods (26a) (26a) is constant or $L_1$, by previously setting a length including $L_1$ and $L_2$ (or length of the adjuster) for the welding position of the torch (3'), the other side portion (a2) of the frame (a) which is positioned at the inner side of the grasp plate, will be a datum or reference plane. Thus, since the other side portion (a2) of the frame (a) is set at a predetermined position with respect to the welding torch (3), as shown by two-dot chained lines in FIG. 4, the clamps can thus be welded to the other side portion (a1) of the frame (a). After completion of welding, the respective rods of all cylinders (12) (27) (26) are constricted to release the respective grasping conditions in the grasp plates (24) (25), so that the welded frame (a) can be taken out of the frame carrying plate (1).

As has been described hereinbefore, according to the present invention, the one side portion of the pipe frame can be set at its given position by means of the guide element provided on the frame carrying plate, while the other frame side portion can be set at its given position by means of the adjusters provided in the bed plate. Therefore, even if the frames may vary in width, the places to be welded can be set at their given positions and thus the welding torch can be used to weld the clamps and the like to the given positions of the frame accurately. As a result of this, the products produced according to the present invention are improved in quality over those produced in the prior art.

What is claimed is:

1. A jig for welding a vehicle seat frame bent formed of a pipe into frame-like configuration, said jig comprising:

a bed plate;

a frame carrying plate movably mounted to said bed plate, said frame carrying plate being adapted for receiving and carrying said seat frame for movement along a given direction;

a pair of grasping members mounted on said frame carrying plate in a facing relationship for movement towards and away from each other along the movement direction of said frame carrying plate, thereby to supportingly grasp said seat frame on said frame carrying plate;

adjustable movement restriction means arranged at one end portion of said bed plate, said means being situated adjacent to one of said pair of grasping members, and adapted for adjustably restricting the movement of said frame carrying plate at the corresponding extremity to thereby define a first reference plane at one corresponding lateral bar section of said seat frame; and a guide element arranged on said frame carrying plate and positioned in an opposite relation with said adjustable movement restriction means, said guide element being adapted for supportingly setting the position of said seat frame to thereby define a second reference plane at the other lateral bar section of said seat frame.

2. The jig in accordance with claim 1, further including a pair of guide members on said frame carrying plate, one being disposed leftwardly of the movement direction of said frame carrying plate and the other disposed rightwardly of the movement direction of said frame carrying plate, said pair of guide members being adapted for supportingly receiving an upper bar section and lower bar section of said seat frame, respectively.

3. The jig in accordance with claim 1, wherein said adjustable movement restriction means are so formed as to adjustably movable in the same direction as the movement direction of said frame carrying plate with respect to said bed plate.

4. The jig in accordance with claim 1, wherein said pair of grasping members each comprises a grasp plate, at least one guide rod fixed to said grasp plate, at least one tubular member through which said guide rod is slidably inserted and an air cylinder for moving said grasp plate, and wherein said air cylinder of one of said grasping members located adjacent to said adjustable movement restriction means is smaller in power than that of the other of said grasping members.

5. In combination:

a jig for welding a vehicle seat frame bent formed of a pipe into a frame-like configuration including a bed plate; a frame carrying plate movably mounted to said bed plate, said frame carrying plate being adapted for receiving and carrying said seat frame for movement along a given direction; a pair of grasping members mounted on said frame carrying plate in a facing relationship for movement towards and away from each other along the movement direction of said frame carrying plate, thereby to supportingly grasp said seat frame on said frame carrying plate; adjustable movement restriction means arranged at one end portion of said bed plate, said means being situated adjacent to one of said pair of grasping members, and adapted for adjustably restricting the movement of said frame carrying plate at the corresponding extremity to thereby define a first reference plate at one corresponding lateral bar section of said seat frame; and a guide element arranged on said frame carrying plate and positioned in an opposite relation with said adjustable movement restriction means, said guide element being adapted for supportingly setting the position of said seat frame to thereby define a second reference plane at the other lateral bar section of said seat frame; and a pair of welding devices, each being movably located above said frame carrying plate so that one of said welding devices is disposed forwardly in the movement direction of said frame carrying plate while the other of said welding devices is disposed rearwardly in the movement direction of said seat frame; and wherein one of said pair of welding devices is movable towards and away from said first reference plane while the other of said pair of welding devices is likewise movable relative to said second reference plane.

6. In combination in accordance with claim 5, wherein said pair of welding devices include a pair of welding torches, one located above said first reference plane and the other located above said second reference plane, such as to be vertically movable respectively.

* * * * *